(12) United States Patent
Pan et al.

(10) Patent No.: US 12,135,565 B2
(45) Date of Patent: Nov. 5, 2024

(54) ADAPTIVE SENSOR CONTROL

(71) Applicant: TUSIMPLE, INC., San Diego, CA (US)

(72) Inventors: Yue Pan, Tucson, AZ (US); Lei Nie, Tucson, AZ (US); Dangyi Liu, San Diego, CA (US); Juexiao Ning, Tucson, AZ (US); Jun Luo, Tucson, AZ (US)

(73) Assignee: TUSIMPLE, INC., San Diego, CA (US)

( * ) Notice: Subject to any disclaimer, the term of this patent is extended or adjusted under 35 U.S.C. 154(b) by 112 days.

(21) Appl. No.: 17/359,089

(22) Filed: Jun. 25, 2021

(65) Prior Publication Data

US 2021/0405651 A1 Dec. 30, 2021

Related U.S. Application Data

(60) Provisional application No. 63/044,659, filed on Jun. 26, 2020.

(51) Int. Cl.
*G05D 1/02* (2020.01)
*G05D 1/00* (2024.01)
(Continued)

(52) U.S. Cl.
CPC ......... *G05D 1/0278* (2013.01); *G05D 1/0088* (2013.01); *G05D 1/024* (2013.01);
(Continued)

(58) Field of Classification Search
CPC .... G05D 1/0278; G05D 1/0088; G05D 1/024; G05D 1/0248; G05D 1/0274; G06T 7/80;
(Continued)

(56) References Cited

U.S. PATENT DOCUMENTS 6,975,923 B2 12/2005 Spriggs
7,742,841 B2 6/2010 Sakai et al.
(Continued)

FOREIGN PATENT DOCUMENTS

CN 102590821 A 7/2012
CN 104363380 A 2/2015
(Continued)

OTHER PUBLICATIONS

Machine Translation of WO-2021073656-A1 (Year: 2021).*
(Continued)

*Primary Examiner* — Sahar Motazedi
(74) *Attorney, Agent, or Firm* — Perkins Coie LLP

(57) ABSTRACT

A method for controlling an autonomous vehicle includes collecting data about a surrounding of the autonomous vehicle, the data including global information of where the autonomous vehicle is positioned; deriving, at least in part based on the collected data, a perceived environment based on localizing the global information; determining a driving condition of the autonomous vehicle based on the perceived environment; modifying, according to the determined driving condition, a first configuration parameter of a sensor to adjust an amount of output data from the sensor; and simultaneously adjusting, according to the determined driving condition, a second configuration parameter for processing the output data to allow consistent data capturing and processing of the output data. A control system can employ such a method, and an autonomous vehicle can utilize such a control system.

18 Claims, 6 Drawing Sheets

(51) Int. Cl.
  *G06T 7/80* (2017.01)
  *G06T 17/05* (2011.01)
(52) U.S. Cl.
  CPC .......... *G05D 1/0248* (2013.01); *G05D 1/0274* (2013.01); *G06T 7/80* (2017.01); *G06T 17/05* (2013.01)
(58) Field of Classification Search
  CPC ....... G06T 17/05; G01S 17/89; G01S 17/931; G05B 13/042
  See application file for complete search history.

(56) References Cited

U.S. PATENT DOCUMENTS

| | | |
|---|---|---|
| 8,346,480 B2 | 1/2013 | Trepagnier et al. |
| 8,706,394 B2 | 4/2014 | Trepagnier et al. |
| 8,718,861 B1 | 5/2014 | Montemerlo et al. |
| 8,983,708 B2 | 3/2015 | Choe et al. |
| 9,088,744 B2 | 7/2015 | Grauer et al. |
| 9,214,084 B2 | 12/2015 | Grauer et al. |
| 9,219,873 B2 | 12/2015 | Grauer et al. |
| 9,282,144 B2 | 3/2016 | Tebay et al. |
| 9,317,033 B2 | 4/2016 | Ibanez-Guzman et al. |
| 9,347,779 B1 | 5/2016 | Lynch |
| 9,418,549 B2 | 8/2016 | Kang et al. |
| 9,494,935 B2 | 11/2016 | Okumura et al. |
| 9,507,346 B1 | 11/2016 | Levinson et al. |
| 9,513,634 B2 | 12/2016 | Pack et al. |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,690,290 B2 | 6/2017 | Prokhorov |
| 9,701,023 B2 | 7/2017 | Zhang et al. |
| 9,712,754 B2 | 7/2017 | Grauer et al. |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,739,609 B1 | 8/2017 | Lewis |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 10,009,554 B1 | 6/2018 | Miao |
| 11,753,036 B1* | 9/2023 | Wimmershoff ...... G05D 1/0212 701/22 |
| 2006/0202038 A1 | 9/2006 | Wang et al. |
| 2008/0174685 A1 | 7/2008 | Shan |
| 2010/0265346 A1 | 10/2010 | Izuka |
| 2011/0247031 A1 | 10/2011 | Jacoby |
| 2012/0281133 A1 | 11/2012 | Kurita |
| 2013/0057740 A1 | 3/2013 | Takaiwa |
| 2016/0094797 A1 | 3/2016 | Yoon et al. |
| 2016/0150165 A1 | 5/2016 | Grauer et al. |
| 2016/0259057 A1 | 9/2016 | Ito |
| 2016/0334230 A1 | 11/2016 | Ross et al. |
| 2016/0344965 A1 | 11/2016 | Grauer et al. |
| 2017/0187970 A1 | 6/2017 | Zhou et al. |
| 2018/0032040 A1* | 2/2018 | Sweet, III .............. H04N 7/181 |
| 2018/0091630 A1* | 3/2018 | Yeung .................. H04B 1/385 |
| 2018/0188060 A1 | 7/2018 | Wheeler et al. |
| 2018/0202822 A1 | 7/2018 | DeLizio et al. |
| 2018/0203122 A1 | 7/2018 | Grauer et al. |
| 2018/0284224 A1 | 10/2018 | Weed |
| 2019/0037120 A1 | 1/2019 | Ohki |
| 2019/0064800 A1 | 2/2019 | Frazzoli |
| 2019/0176702 A1* | 6/2019 | Shidochi .................. B60R 1/06 |
| 2019/0179025 A1* | 6/2019 | England ............... G05D 1/0088 |
| 2019/0187716 A1 | 6/2019 | Cantrell et al. |
| 2019/0204423 A1 | 7/2019 | O'Keeffe |
| 2019/0230303 A1 | 7/2019 | Wang et al. |
| 2019/0373188 A1 | 12/2019 | Takahashi |
| 2020/0084361 A1 | 3/2020 | Xu et al. |
| 2020/0174469 A1* | 6/2020 | Trumpore ............... G01S 7/006 |

FOREIGN PATENT DOCUMENTS

| | | |
|---|---|---|
| CN | 204314826 U | 5/2015 |
| CN | 205230349 U | 5/2016 |
| CN | 106826833 A | 6/2017 |
| CN | 107229625 A | 10/2017 |
| CN | 107743590 A | 2/2018 |
| CN | 108353140 A | 7/2018 |
| JP | 2010070127 A * | 4/2010 |
| KR | 100802511 B1 | 2/2008 |
| KR | 100917012 B1 | 9/2009 |
| WO | 2014166245 A1 | 10/2014 |
| WO | 2017009848 A1 | 1/2017 |
| WO | 2017089596 A1 | 6/2017 |
| WO | 2017183480 A1 | 10/2017 |
| WO | WO-2019114220 A1 * | 6/2019 ........... G05D 1/0088 |
| WO | 2020055833 A1 | 3/2020 |
| WO | WO-2021073656 A1 * | 4/2021 |

OTHER PUBLICATIONS

Machine Translation of WO-2019114220-A1 (Year: 2019).*
Machine Translation of JP-2010070127-A (Year: 2010).*
U.S. Appl. No. 16/250,823 Non-Final Office Action Mailed Nov. 27, 2020, pp. 1-8.
U.S. Appl. No. 16/250,823 Final Office Action, Mailed May 15, 2020, pp. 1-10.
U.S. Appl. No. 16/250,823 Non-Final Office Action Mailed Oct. 8, 2019.
U.S. Appl. No. 16/127,022 Non-Final Office Action Mailed Jun. 2, 2020, pp. 1-8.
U.S. Appl. No. 16/127,022 Final Office Action Mailed Nov. 2, 2020, pp. 1-9.
U.S. Appl. No. 16/127,022 Notice of Allowance, Mailed Jan. 27, 2021, pp. 1-8.
International Application No. PCT/US2019/050364 International Search Report and Written Opinion Mailed Dec. 26, 2019. (9 pages).
Takuya Yoda, et al. Dynamic Photometric Stereo Method Using a Mlti-Tap CMOS Image Sensor. 23rd international Conference on Pattern Recognition (ICPR) Dec. 8, 2016. pp. 2356-2361.
Koshiro Moriguchi et al. Time-of-Flight Range Image Sensor Based on Exposure Coding with a Multi-aperture Imaging System. 2016 by ITE transaction on a Media Technology and Applications (MTA), vol. 4, No. 1, 2016. pp. 78-83.
Chinese Application No. 201810066893.8 Office Action Mailed Oct. 31, 2019.
Notice of Allowance Mailed Mar. 24, 2021, pp. 1-8.
European Patent Office, Extended European Search Report for EP 19859384.0, Mailing Date: Apr. 4, 2022, 10 pages.
U.S. Appl. No. 17/325,135 Notice of Allowance mailed Aug. 29, 2022, pp. 1-11.
Search Report from corresponding Chinese Patent Application No. 201980058923.3, dated Mar. 13, 2023 (3 pages).
Office Action from corresponding Chinese Patent Application No. 201980058923.3, dated Mar. 16, 2023 (5 pages).
European Patent Office, Communication pursuant to Article 94(3) EPC for EP 19859384.0, Mailing Date: Aug. 4, 2023, 5 pages.
U.S. Patent & Trademark Office, Non-Final Office Action for U.S. Appl. No. 17/361,279, mailed on Jul. 7, 2023, 11 pages.

(56) References Cited

OTHER PUBLICATIONS

U.S. Patent & Trademark Office, Notice of Allowance for U.S. Appl. No. 17/986,744, mailed Sep. 13, 2023, 8 pages.
U.S. Appl. No. 17/986,766, Non-Final Office Action mailed Mar. 20, 2023, 10 pages.
U.S. Patent & Trademark Office, Non-Final Office Action for U.S. Appl. No. 18/533,417, mailed Jul. 24, 2024, 9 pages.
Australian Patent Office, Examination Report No. 1 for Appl. No. 2019338297, mailed May 21, 2024, 3 pages.

* cited by examiner

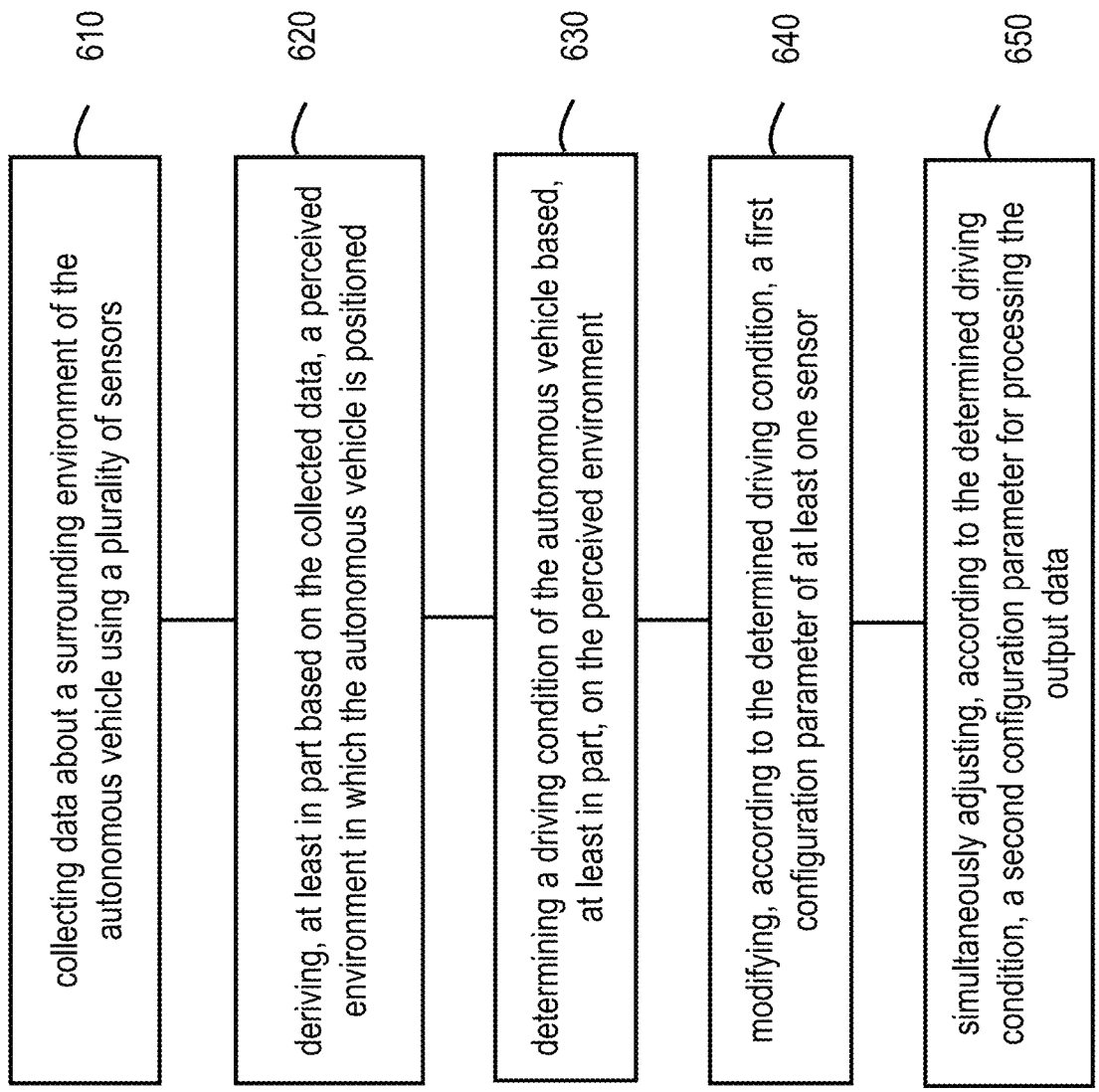

ADAPTIVE SENSOR CONTROL

CROSS-REFERENCE TO RELATED APPLICATIONS

This patent document claims priority to and benefits of U.S. Provisional Patent Application No. 63/044,659, entitled "ADAPTIVE SENSOR CONTROL", filed Jun. 26, 2020. The entire content of the before-mentioned patent application is incorporated by reference as part of the disclosure of this patent document.

TECHNICAL FIELD

This patent document relates to autonomous vehicles and, in particular, to adaptive control of multiple sensors of the autonomous vehicles.

BACKGROUND

Autonomous vehicles, also known as self-driving vehicles, are vehicles that are capable of sensing the environment and moving with little or no human input. Long distance trucks are seen as being in the forefront of adopting and implementing such technology. With a fleet of autonomous trucks on the road, it is essential to ensure the performance and safety of such trucks.

SUMMARY

This document discloses embodiments related to methods, devices, and systems that can alleviate data transfer and/or data processing bandwidth issues for an autonomous vehicle caused by a large amount of data from multiple high-end sensors while ensuring precise detection of the autonomous vehicle surroundings (also referred to as external environment herein).

One exemplary aspect of the disclosed embodiments relates to a control system for an autonomous vehicle. The control system includes a plurality of sensors configured to collect data about a surrounding of the autonomous vehicle, a processor, and a memory including processor executable code. The processor executable code, upon execution by the processor, configures the processor to receive the collected data from the plurality of sensors; determine, at least in part based on the collected data, a driving condition of the autonomous vehicle; and modify, according to the determined driving condition, one or more configuration parameters of at least one sensor of the plurality of sensors to adjust an amount of output data from the at least one sensor.

The following features may be present in the control system in any reasonable combination. The control system can include a first configuration parameter of at least one sensor and a second configuration parameter related to processing data collected from the at least one sensor which is adjusted simultaneously (e.g., at or about the same time) with the first configuration parameter of the at least one sensor. Simultaneous adjustment of the first and second configuration parameters can facilitate consistent data capturing and processing of the output data. The plurality of sensors may include at least one camera. A light detection and ranging (LIDAR) sensor may be included in the plurality of sensors. The system can use global information which can include a global coordinate of the autonomous vehicle associated with the control system. The control system's processor may be configured to derive perceived surroundings of the autonomous vehicle based, at least in part, on data from the plurality of sensors. The control system's processor may be configured to derive the perceived surroundings based additionally on one or more high-definition maps. In the control system, the at least one sensor may include a camera, and the one or more configuration parameters may include a resolution or a frame rate of the camera. In such a control system in which the at least one sensor includes a camera, the one or more configuration parameters can also include an aperture of the camera. The control system can also include a plurality of sensor mounts that correspond to each of the plurality of sensors, and the processor can be configured to adjust the plurality of sensor mounts to, in turn, adjust a position or an angle of each of the plurality of sensors. Each of the plurality of sensor mounts may include a motor to allow motorized movement of the plurality of sensors. The processor can be configured to control each of the plurality of sensor mounts independently.

Another example aspect of the disclosed embodiments relates to a method for controlling an autonomous vehicle. The method includes collecting data about a surrounding of the autonomous vehicle using a plurality of sensors, determining, at least in part based on the collected data, a driving condition of the autonomous vehicle, and modifying, according to the determined driving condition, one or more configuration parameters of at least one sensor of the plurality of sensors to adjust an amount of output data from the at least one sensor.

The following features may be present in the method in any reasonable combination. The method may include modifying a first configuration parameter of at least one sensor of the plurality of sensors to adjust an amount of output data from the at least one sensor in accordance with the determined driving condition. The method can also include simultaneously adjusting a second configuration parameter for processing the output data to allow consistent data capturing and processing of the output data in accordance with the determined driving condition. In the method, localizing global information can include converting a global coordinate of the autonomous vehicle into a local coordinate based on one or more stored high-definition maps. Deriving a perceived environment of the autonomous vehicle can include constructing a three-dimensional representation of an external environment in the method. The driving condition can, for example, include determining whether the autonomous vehicle is positioned at a junction. For example, the driving condition can include determining whether the autonomous vehicle is driving uphill or downhill. The method can also include a camera as part of the at least one sensor, and in such a method, modifying the first configuration parameter can include modifying a resolution, a frame rate, or a while balance setting of the camera. The method can also include adjusting a position or an angle of each of the plurality of sensors via a plurality of sensor mounts.

Yet another example aspect of the disclosed embodiments relates to an autonomous vehicle that includes an engine, a steering system, a brake system, a monitoring system that comprises a plurality of sensors to monitor a surrounding of the autonomous vehicle, and a control system that includes a processor, and a memory including processor executable code. The processor executable code upon execution by the processor configures the processor to control the engine, the steering system, and the brake system based on the monitoring. The processor is further configured to determine, at least in part based on data from the plurality of sensors, a driving condition of the autonomous vehicle, and modify, according to the determined driving condition, one or more configuration parameters of at least one sensor of the plurality of sensors to adjust an amount of output data from the at least one sensor.

The following features can be included in the autonomous vehicle in any reasonable combination. The processor of the control system of the autonomous vehicle can also be configured to modify, according to the determined driving condition, a first configuration parameter of at least one sensor of the plurality of sensors to adjust an amount of output data from the at least one sensor; and simultaneously adjust, according to the determined driving condition, a second configuration parameter for processing the output data to allow consistent data capturing and processing of the output data. The processor of the control system of the autonomous vehicle may also be configured to process the output data according to the second configuration parameter.

The details of one or more implementations are set forth in the accompanying attachments, the drawings, and the description below. Other features will be apparent from the description and drawings, and from the claims.

BRIEF DESCRIPTION OF THE DRAWINGS

FIG. 6 is a flowchart representation of a method 400 for controlling an autonomous vehicle in accordance with one or more embodiments of the present technology.

DETAILED DESCRIPTION

Figure 1:
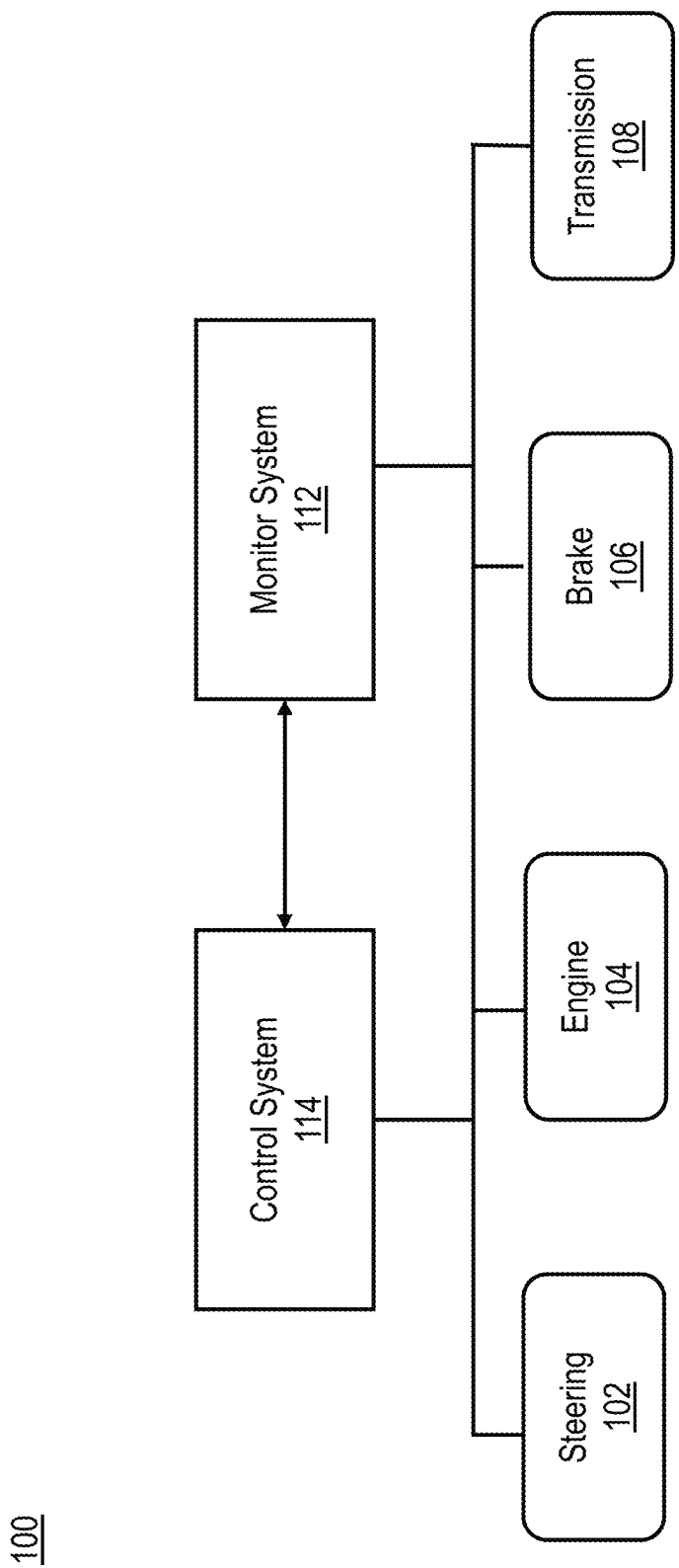
FIG. 1 is a schematic diagram of an autonomous vehicle in accordance with one or more embodiments of the present technology.

Precise detection and/or perception of the areas surrounding an autonomous vehicle is crucial for the successful application of autonomous vehicles. To enable an autonomous vehicle to precisely identify its own state (e.g., position, velocity, etc.) as well as the conditions and/or states of the objects (e.g., vehicles, roads, road lanes, road crossings, pedestrians, road signs, buildings, etc.) in its surroundings, a variety of sensors, such as light detection and ranging (LIDAR) devices, radars, ultrasound sensors, and cameras, is employed to facilitate accurate maneuvering of the vehicle. Data inputs from multiple sensors, however, pose a challenge to data communication and/or data processing bandwidth requirements of the autonomous vehicle. For example, LIDAR sensors may generate a three-dimensional (3D) representation of the autonomous vehicle surroundings (e.g., in a form of a 3D point cloud) that includes thousands of data points. High-resolution cameras can provide a large amount of image data reaching, or requiring, a bandwidth of multiple Gigabytes per second. Techniques disclosed herein can be implemented in various embodiments to adaptively adjust, based on a driving condition of the autonomous vehicle, configurations of the vehicle sensors so that bandwidth requirements can be reduced, e.g., while providing sufficient field of view and data precision for the vehicle. The driving condition or conditions is/are conditions in which the autonomous vehicle is driving which can include the state of the autonomous vehicle itself as well as the states of other vehicles, external conditions such as weather conditions (e.g., rain, snow, fog, etc.) and/or characteristics of the terrain or environment in which the autonomous vehicle is driving (e.g., whether the autonomous vehicle is driving in a city or on a highway or whether it is driving on a paved or unpaved road, and/or the road lane in which the autonomous vehicle is currently positioned). The state of the autonomous vehicle can include, e.g., its position (e.g., its position relative to a certain point or object and/or its position as returned by a global positioning system (GPS) device in the vehicle and/or its position as determined by a set of coordinates within a system of coordinates or on a map), rotation (e.g., relative to a certain direction or in a certain system of coordinates), speed (linear and/or angular), acceleration (linear and/or angular), velocity (a vector characterized by a direction of the vehicle movement and vehicle's speed), number of revolutions per minute of the vehicle's engine, status of the vehicle brakes, fuel level, etc.). The states of the other vehicles within a certain area around or within a certain distance from the autonomous vehicle can include their positions or coordinates, velocities, accelerations, and/or distances from the autonomous vehicle. The states of the other vehicles can also include any of the types of the states that are used to characterize the autonomous vehicle (e.g., the status of their brakes).

FIG. 1 is a schematic diagram of an autonomous vehicle system 100 in accordance with one or more embodiments of the present technology. The vehicle 100 includes at least a steering system 102, an engine 104, a brake system 106, and a transmission 108. To enable autonomous driving, the vehicle 100 also includes a monitor system 112 that monitors and/or measures the state of the autonomous vehicle as well as, for example, the states of the vehicles within a certain area around or within a certain distance from the autonomous vehicle. The monitor system 112 can include a sensor control system that controls multiple types of sensors to monitor the surroundings of the autonomous vehicle (e.g., a 3D space or a 2D area around the autonomous vehicle or proximate to the autonomous vehicle, including objects such as, for example, other vehicles, pedestrians, road signs, etc. in that space or area) as well as the states of the vehicles and objects in the surroundings. The system 100 further includes a control system 114 that is configured to control various components of the autonomous vehicle (e.g., the steering system 102, the engine 104, the brake system 106, and/or the transmission system 108) based on the data (e.g., results of the sensing and/or measurements) provided by the monitor system 112 that can include component states determined by the monitor system 112 (e.g., component status; whether a component is functioning properly or any error codes related to the component).

Figure 2:
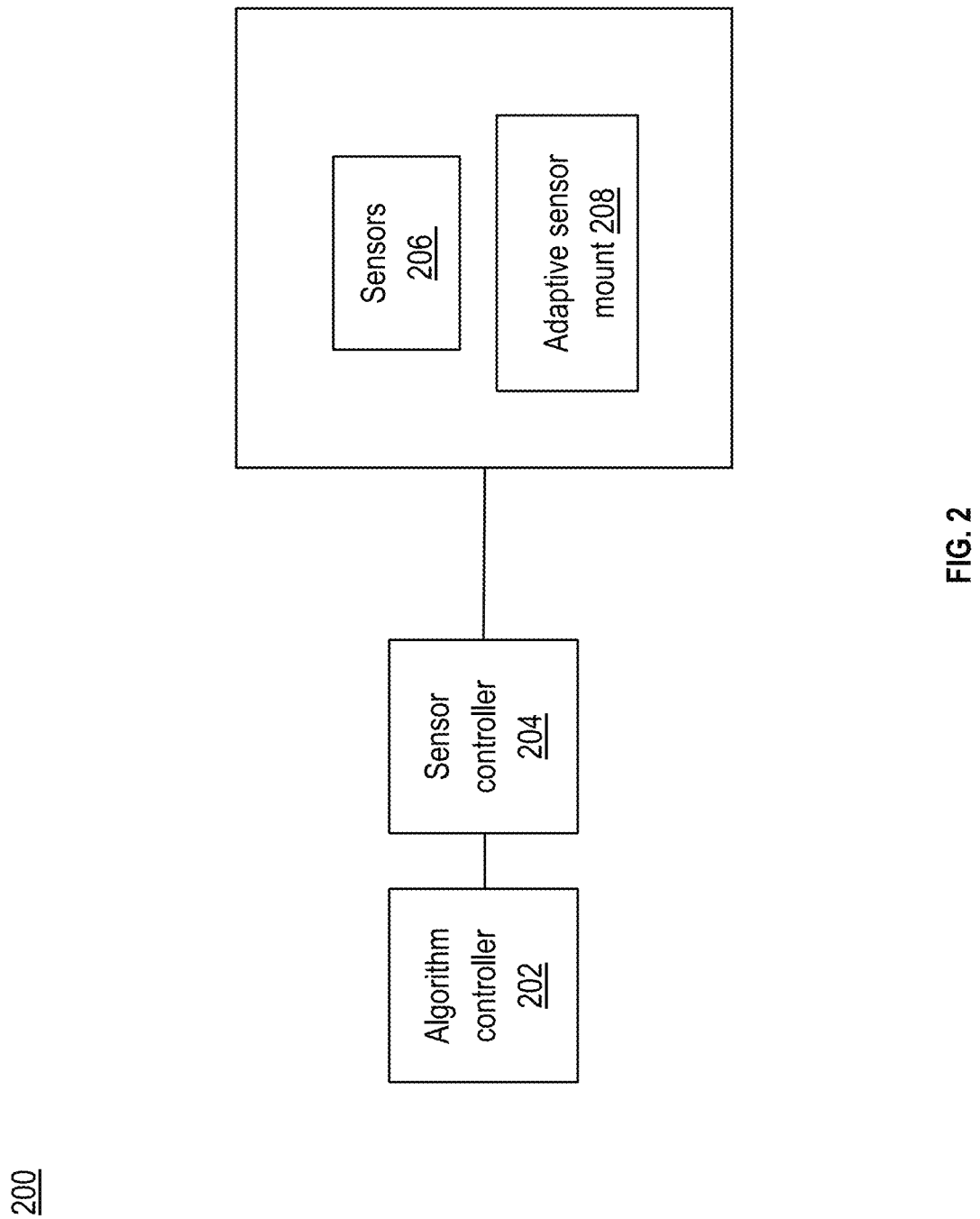
FIG. 2 is a schematic diagram of an example sensor control system in accordance with one or more embodiments of the present technology.

FIG. 2 is a schematic diagram of an example sensor control system 200 in accordance with one or more embodiments of the present technology. The sensor control system can be implemented as a part of the control system 114 shown in FIG. 1. The sensor control system 200 includes an algorithm controller 202. The algorithm controller 202 is configured to determine a driving condition of the autonomous vehicle based, for example, on past sensor data (e.g., point cloud data from one or more LIDAR sensors of the autonomous vehicle and/or images of the autonomous vehicle surroundings captured by one or more video cameras of the autonomous vehicle) as well as external information (e.g., information from one or more maps, and/or Global Positioning System (GPS) location of the autonomous vehicle). The past sensor data can correspond, for example, to the sensor data collected by the autonomous vehicle sensors (e.g., LIDARs, cameras, etc.) during a certain time interval prior to the moment when the driving condition of the autonomous vehicle is determined. For example, the vehicle can be equipped with one or more gyroscopes to allow the algorithm controller 202 to determine whether the vehicle is going uphill or downhill (e.g., based on captured data from the one or more gyroscopes). As another example, the algorithm controller 202 can also determine whether an autonomous vehicle is in merging traffic or is approaching an intersection or a T-junction or a Y-junction or any other type of road intersection or crossing for subsequent operations.

Figure 3:
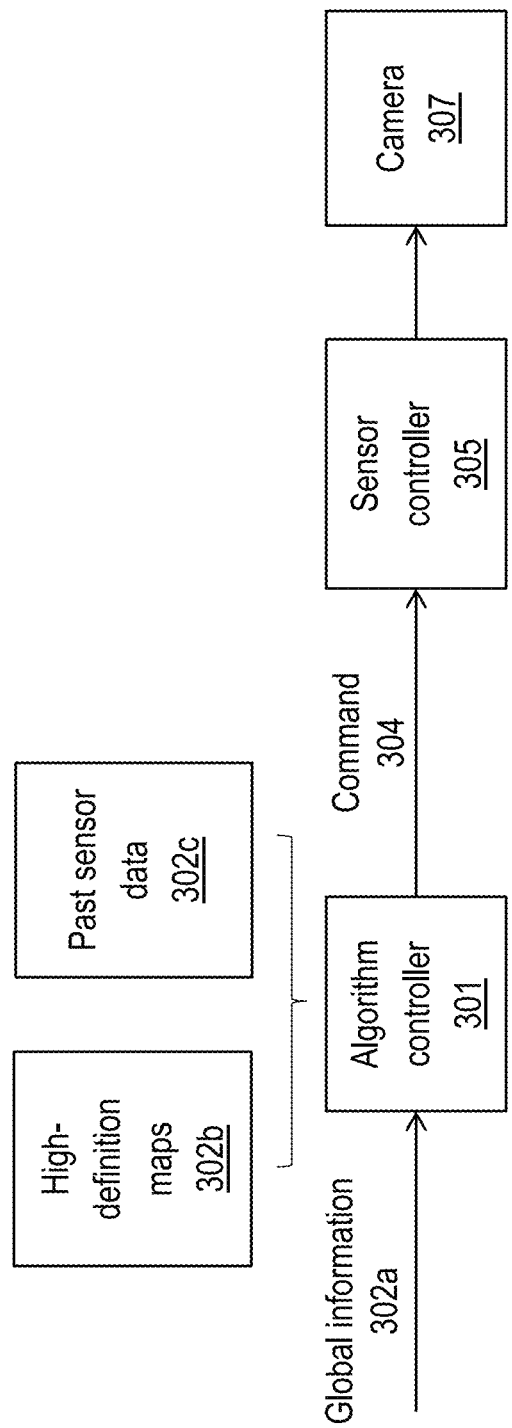
FIG. 3 shows exemplary operations performed by an algorithm controller in accordance with one or more embodiments of the present technology.

FIG. 3 shows exemplary operations performed by an algorithm controller in accordance with one or more embodiments of the present technology. When, for example, the autonomous vehicle is approaching a T-junction, the algorithm controller 301 (202 in FIG. 2) can receive global information 302a such as the global coordinates of the autonomous vehicle (e.g., a latitude and/or a longitude coordinate which can be a part of GPS coordinates of the autonomous vehicle) using, for example, a device in the autonomous vehicle (e.g., a transceiver or a GPS receiver). For example, the global information 302a can be received for multiple points along a path or a trajectory of the autonomous vehicle. The algorithm controller 301 can further leverage, e.g., current sensor data along with the stored data (e.g., data stored on a device in the autonomous vehicle and/or data stored on a remote server), such as high-definition maps 302b of the area(s) around the autonomous vehicle as well as past sensor data 302c collected from one or more sensors of the autonomous vehicle, to localize the received global information 302a and to derive a perceived environment that the autonomous vehicle is positioned in via, e.g., constructing a representation (e.g., a three-dimensional or a two-dimensional representation) of the external environment. In some implementations, the perceived environment is a three-dimensional or a two-dimensional representation (e.g., a model such as a computer-generated model) of the external environment. The external environment can include, e.g., one or more 3D volumes or spaces and/or 2D surfaces that are external with respect to the autonomous vehicle, as well as objects positioned within those spaces and/or on those surfaces. For example, the global coordinates can be converted to local coordinates on a local map (e.g., a high-definition or high-resolution one). Furthermore, the local coordinates can be analyzed based on past sensor data 302c (as well as, optionally, current sensor data) to determine a perceived environment that the vehicle is positioned in. The three-dimensional representation of the external environment can include, for example, 3D point clouds obtained by one or more LIDAR sensors of the autonomous vehicle. The three-dimensional representation of the external environment can also include 3D bounding boxes determined for the objects (e.g., vehicles, pedestrians, road signs, buildings, etc.) using, for example, the point cloud data. The three-dimensional representation of the external environment can include 3D objects produced by an object segmentation algorithm using, for example, past and/or current sensor data. In some implementations, the perceived environment corresponds to a 2D representation of the external environment. In such a case, the 2D representation can include images captured by one or more cameras of the autonomous vehicle, as well as 2D bounding boxes and/or contours of the individual objects in those images. For example, the algorithm controller 301 can determine that the vehicle is approaching a T-junction based on the localized information, such as the perceived environment. The algorithm controller 301 can then proceed to send a command 304 to the sensor controller 305 based on the perceived environment and/or driving condition.

Referring back to FIG. 2, the algorithm controller 202 outputs the determined driving condition of the autonomous vehicle to a sensor controller 204. The sensor controller 204 can control various sensors 206 of the autonomous vehicle according to the determined driving condition. In some embodiments, at least one sensor in the sensors 206 is equipped with an adaptive sensor mount 208 to allow the sensor controller 204 to adaptively change sensor behavior (e.g., position and/or orientation). The sensor mount 208 can include a motor that allows motorized movement (e.g., pan, tilt, or angle adjustment) of the sensor according to the driving condition. For example, when the algorithm controller 202 determines that the vehicle is going uphill or downhill, the algorithm controller 202 outputs the determined driving condition to the sensor controller 204. The sensor controller 204 then sends commands to one or more adaptive sensor mounts 208 to adjust the angles of the corresponding sensors 206 (e.g., video cameras, LIDARs, or ultrasound sensors, etc.) so that the fields of view of the sensors can be appropriately adjusted for the uphill and/or downhill conditions. In the example shown in FIG. 3, the sensor controller 305 can be commanded by the algorithm controller 301 to activate a side camera on the autonomous vehicle when, for example, the algorithm controller 301 determines that the autonomous vehicle is approaching a road intersection. A side camera 307 is then activated accordingly.

In some embodiments, when the algorithm controller 202 determines that the vehicle is in merging traffic (e.g., merging from a ramp to highway traffic), the sensor controller 204 sends signals to the sensor mounts 208 so that the positions of the sensors can be adjusted to achieve optimal field of view. For example, the scanning direction of LIDAR sensors can be adaptively changed when the vehicle is trying to merge into the main road. Sensors that are equipped with adaptive mounts can adjust angles independent of each other to allow the sensor controller 204 to control each of the sensor flexibly.

Figure 4:
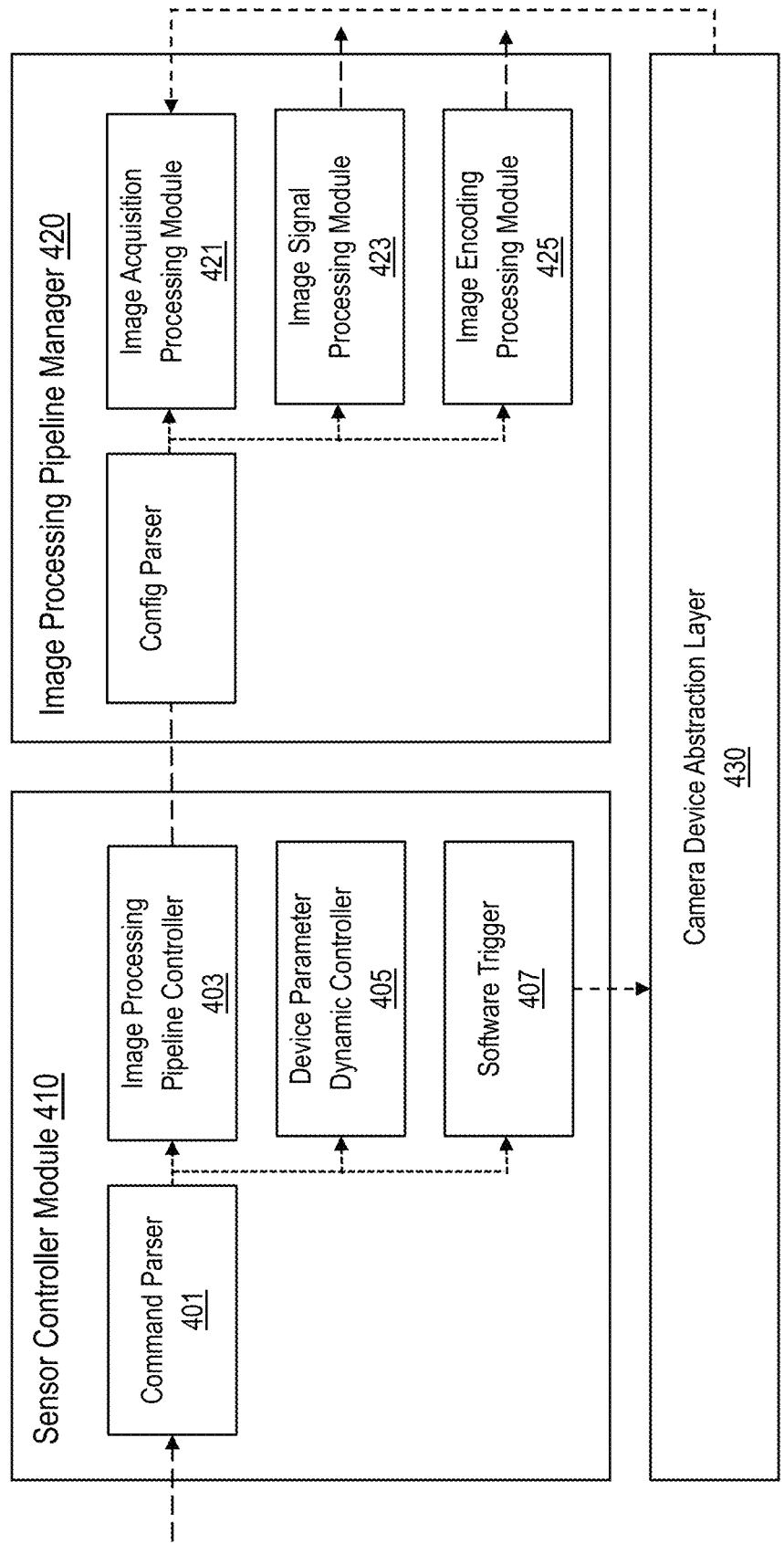
FIG. 4 illustrates an example architecture of a sensor controller and a sensor device in accordance with one or more embodiments of the present technology.

In some embodiments, the sensor controller 204 can update, according to the determination of the algorithm controller 202, configurations (e.g., operating parameters and/or settings) of the sensors 206 in real-time to adaptively adjust the output of the sensors according to data bandwidth requirements. FIG. 4 illustrates an example architecture 400 of a sensor controller configured to interface with a sensor device (e.g., a video camera) in accordance with one or more embodiments of the present technology. The sensor controller module 410 includes a command parser 401 to parse commands from the algorithm controller (202 in FIG. 2 or 301 in FIG. 3). The sensor controller module 410 also includes an image processing pipeline controller 403 that is in communication with an image processing pipeline manager 420. The image processing pipeline controller 403 can adjust configurations for the image processing pipeline manager 420 to determine how the images should be acquired and/or processed. For example, the image acquisition processing module 421 can be configured to be in virtual mode (e.g., for processing testing images) or real-device mode. The image signal processing module 423 can be configured to handle different image formats, such as, for example, mono16, nono8, and/or bayer24. The image encoding processing module 425 can be configured with different encoding algorithms, such as H.264, H.265 and others.

The sensor controller module 410 further includes device parameter dynamic controller 405 that triggers (via, e.g., a software trigger 407) dynamic update of sensor configurations via a device abstraction layer 430. For example, referring back to FIG. 2, the sensor controller 204 can re-configure the resolution (e.g., frame size and/or frame aspect ratio), the frame rate (measured, e.g., in frames per second), the aperture (e.g., aperture size), and/or the field of view of a camera. For example, the resolution of the camera can be adjusted to a smaller size (e.g., from a resolution of 2048×1152 to a resolution of 1025×576) or the camera can be temporality turned off when the driving condition (as determined by the algorithm controller 202) remains the same for at least a pre-defined period of time (e.g., the vehicle is on an interstate highway with light traffic). The reduced resolution can help alleviate data transfer bandwidth issues caused by multiple high-resolution cameras. Similarly, the frame rate can be reduced (e.g., <24 fps) to produce less image data when, for example, the autonomous vehicle is driving at a low speed (e.g., below 40 km/h). As another example, when the algorithm controller 202 determines that the vehicle has exited the interstate highway (e.g., based on the perceived environment derived by the algorithm controller) and is now entering an urban area with heavy traffic, the resolution and/or the frame rate of the camera(s) can be adjusted back to ensure accurate and precise detection of the autonomous vehicle surroundings. The exposure and/or white balance settings of the camera(s) can also be adjusted based on the environment (e.g., daytime or nighttime). Once the sensor controller 204 (410 in FIG. 4) reconfigures a parameter of a sensor (e.g., a camera), the sensor controller 204 sends (e.g., simultaneously) a corresponding parameter or command to the image processing pipeline manager 420. The sensor controller module 410 coordinates both the sensor device(s) and the image processing pipeline based on the parameter or the command so that image capture and processing are performed in a consistent manner.

Referring back to FIG. 2, in some embodiments, the vehicle can be equipped with multiple front sensors, side sensors, and back sensors (e.g., such as video cameras). When, for example, the algorithm controller 202 of the autonomous vehicle determines that the vehicle is moving forward (e.g., based on the driving condition of the autonomous vehicle determined, at least in part, based on the perceived environment derived or determined by the algorithm controller), the sensor controller 204 can send corresponding commands to the back sensors so that at least a subset of the back sensors is (temporarily) disabled. In some embodiments, the back sensors include multiple cameras. Instead of disabling these cameras, the resolution (e.g., frame size) and/or frame rate of the back cameras can be reduced to alleviate system load. Upon determining that the driving condition changes (e.g., the vehicle is backing up), the sensor controller 204 can send another set of commands to adaptively adjust the resolution and/or frame rate of the back sensors to provide accurate detection of the back surroundings.

Figure 5:
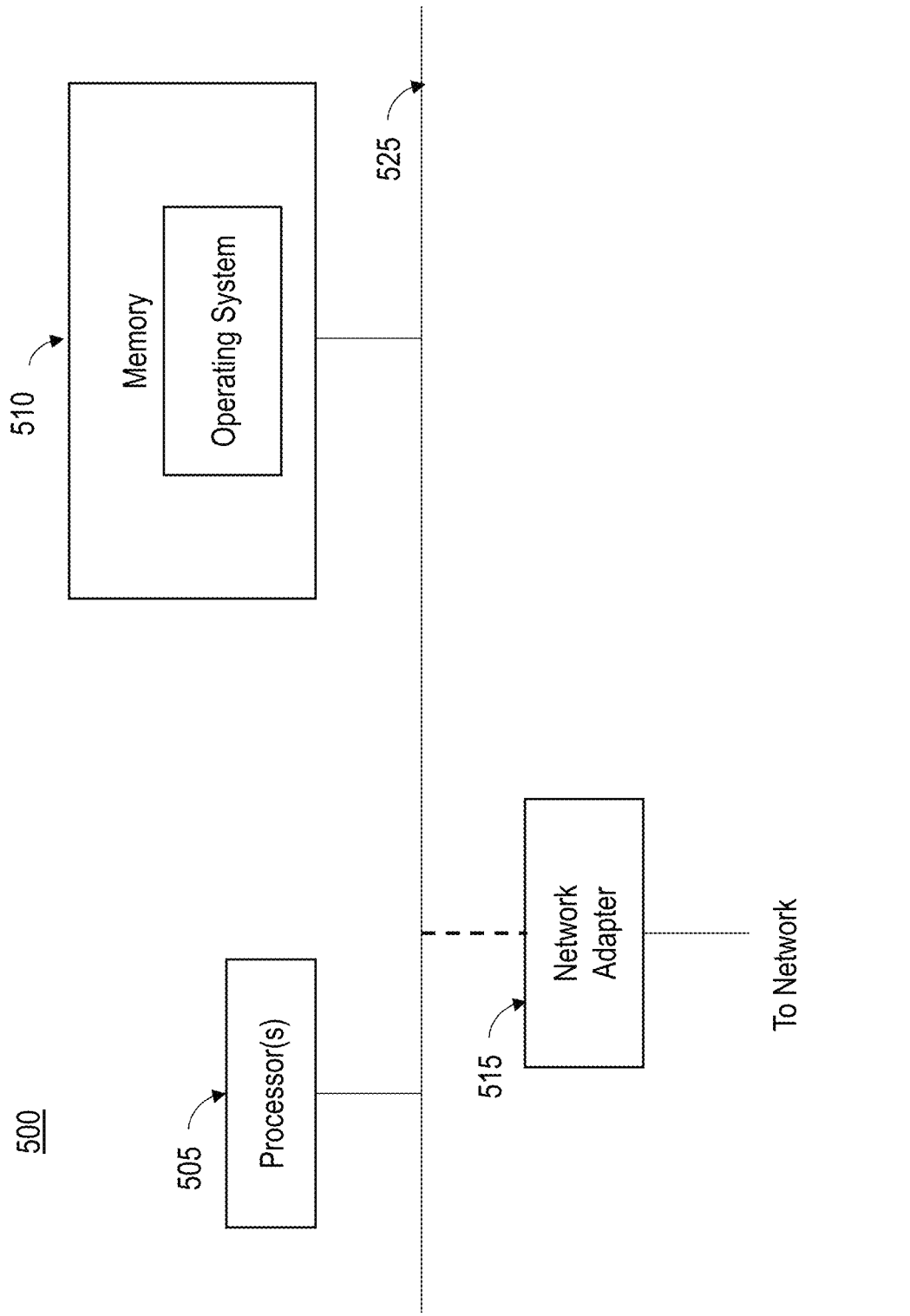
FIG. 5 is a block diagram illustrating an example of the architecture for a computer system or other control device that can be utilized to implement various portions of the presently disclosed technology.

FIG. 5 is a block diagram illustrating an example of the architecture for a computer system or other control device 500 that can be utilized to implement various portions of the presently disclosed technology, such as the algorithm controller and/or the sensor controller as shown in FIG. 1. For example, the system 500 can be used for processing data from the sensors and/or systems of the autonomous vehicle. In FIG. 5, the computer system 500 includes one or more processors 505 and memory 510 connected via an interconnect 525. The interconnect 525 may represent any one or more separate physical buses, point to point connections, or both, connected by appropriate bridges, adapters, or controllers. The interconnect 525, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 505 may include central processing units (CPUs) to control the overall operation of, for example, the host computer. In certain embodiments, the processor(s) 505 accomplish this by executing software or firmware stored in memory 510. The processor(s) 505 may be, or may include, one or more programmable general-purpose or special-purpose microprocessors, digital signal processors (DSPs), programmable controllers, application specific integrated circuits (ASICs), programmable logic devices (PLDs), graphics processing units (GPUs) or the like, or a combination of such devices.

The memory 510 can be or include the main memory of the computer system. The memory 510 represents any suitable form of random-access memory (RAM), read-only memory (ROM), flash memory, or the like, or a combination of such devices. In use, the memory 510 may contain, among other things, a set of machine instructions which, when executed by processor 505, causes the processor 505 to perform operations to implement embodiments of the presently disclosed technology.

Also connected to the processor(s) 505 through the interconnect 525 is a (optional) network adapter 515. The network adapter 515 provides the computer system 500 with the ability to communicate with remote devices, such as the storage clients, and/or other storage and/or data processing servers, and may be, for example, an Ethernet adapter or Fiber Channel adapter.

FIG. 6 is a flowchart representation of a method 600 for controlling an autonomous vehicle in accordance with one or more embodiments of the present technology. The method 600 includes, at operation 610, collecting data about a surrounding environment (also referred to as external environment herein) of the autonomous vehicle using a plurality of sensors and/or devices of the autonomous vehicle. The data can include global information of where the autonomous vehicle is positioned. The method 600 includes, at operation 620, deriving, at least in part based on the collected data, a perceived environment in which the autonomous vehicle is positioned. In some embodiments, the perceived environment can be derived or obtained based on localizing the global information. The method 600 includes, at operation 630, determining a driving condition of the autonomous vehicle based, at least in part, on the perceived environment. The method 600 further includes, at operation 640, modifying, according to the determined driving condition, a first configuration parameter of at least one sensor of the plurality of sensors to adjust an amount of output data from the at least one sensor. The method 600 also includes, at operation 650, adjusting (e.g., simultaneously (e.g., at or about the same time) with modifying the first configuration parameter), according to the determined driving condition, a second configuration parameter for processing the output data (e.g., the second configuration parameter is related to processing the output data from the at least one sensor) by a processor (such as, e.g., the processor(s) 505 of the system 500) to allow consistent data capturing and processing of the output data. The second configuration parameter can be related, for example, to a parameter or a setting of the processor-executable code stored in the memory 510 of the system 500 and used for processing the output data by one or more processors 505 of the system 500.

In some embodiments, localizing the global information comprises converting a global coordinate of the autonomous vehicle based on one or more stored high-definition maps. In some embodiments, deriving the perceived environment comprises constructing a three-dimensional representation of an external environment. In some embodiments, the driving condition comprises determining whether the autonomous vehicle is positioned at a junction. In some embodiments, the driving condition comprises determining whether the autonomous vehicle is driving uphill or downhill. In some embodiments, the at least one sensor includes a camera, and modifying the first configuration parameter comprise modifying a resolution, a frame rate, or a white balance setting of the camera. In some embodiments, the method comprises adjusting a position or an angle of each of the plurality of sensors via a plurality of sensor mounts.

In another example aspect, a control system for an autonomous vehicle includes a plurality of sensors configured to collect data about a surrounding of the autonomous vehicle, a processor, and a memory including processor executable code. The processor executable code upon execution by the processor configures the processor to receive the collected data from the plurality of sensors, the collected data comprising global information of where the autonomous vehicle is positioned; derive, at least in part based on the collected data, a perceived surrounding based on localizing the global information; determine a driving condition of the autonomous vehicle based on the perceived surrounding; modify, according to the determined driving condition, a first configuration parameter of at least one sensor of the plurality of sensors to adjust an amount of output data from the at least one sensor; and simultaneously adjust, according to the determined driving condition, a second configuration parameter for processing the output data to allow consistent data capturing and processing of the output data.

In some embodiments, the plurality of sensors includes at least one camera. In some embodiments, the plurality of sensors further includes a light detection and ranging (LIDAR) sensor. In some embodiments, the global information comprises a global coordinate of the autonomous vehicle. In some embodiments, the processor is configured to derive the perceived surrounding further based on one or more high-definition maps. In some embodiments, the at least one sensor includes a camera, and the one or more configuration parameters includes a resolution or a frame rate of the camera. In some embodiments, the one or more configuration parameters further includes an aperture of the camera.

In some embodiments, the control system further includes a plurality of sensor mounts corresponding to each of the plurality of sensors. The processor is further configured to adjust the plurality of sensor mounts to adjust a position or an angle of each of the plurality of sensors. In some embodiments, each of the plurality of sensor mounts includes a motor to allow motorized movement of the plurality of sensors. In some embodiments, the processor is configured to control each of the plurality of sensor mounts independently.

In yet another example aspect, an autonomous vehicle includes an engine, a steering system, a brake system, a monitoring system that comprises a plurality of sensors to monitor a surrounding of the autonomous vehicle, and a control system that includes a processor, and a memory including processor executable code. The processor executable code upon execution by the processor configures the processor to control the engine, the steering system, and the brake system based on the monitoring. The processor is further configured to receive the collected data from the plurality of sensors, the collected data comprising global information of where the autonomous vehicle is positioned; derive, at least in part based on the collected data, a perceived surrounding based on localizing the global information; determine a driving condition of the autonomous vehicle based on the perceived surrounding; modify, according to the determined driving condition, a first configuration parameter of at least one sensor of the plurality of sensors to adjust an amount of output data from the at least one sensor; and simultaneously adjust, according to the determined driving condition, a second configuration parameter for processing the output data to allow consistent data capturing and processing of the output data.

The techniques disclosed herein can alleviate system load of an autonomous vehicle in certain driving conditions while ensuring an accurate detection of the surrounding area. The disclosed and other embodiments, modules, and the functional operations described in this document, for example, the algorithm controller and the sensor controller, can be implemented in digital electronic circuitry, or in computer software, firmware, or hardware, including the structures disclosed in this document and their structural equivalents, or in combinations of one or more of them. The disclosed technology and other embodiments can be implemented as one or more computer program products, for example, one or more modules of computer program instructions encoded on a computer readable medium for execution by, or to control the operation of, a data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data include all forms of non-volatile memory, media, and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements, and variations can be made based on what is described and illustrated in this patent document.

What is claimed is:

1. A control system for an autonomous vehicle, comprising:
   a plurality of sensors equipped on the autonomous vehicle, facing different directions, and configured to monitor a surrounding of the autonomous vehicle by collecting data about the surrounding;
   a processor, and
   a memory including processor executable code, wherein the processor executable code, upon execution by the processor, configures the processor to control a steering system, and/or a brake system of the autonomous vehicle based on the monitoring by performing operations including:
   receiving the collected data from the plurality of sensors as current sensor data, the collected data comprising global information of where the autonomous vehicle is positioned;
   deriving, at least in part using the current sensor data, an environment perceived by the autonomous vehicle based on localizing the global information;
   determining a driving condition of the autonomous vehicle based on the perceived environment and past sensor data that has been captured by at least one camera or at least one light detection and ranging (LIDAR) sensor of the plurality of sensors during a certain time interval prior to a moment at which the driving condition is determined, wherein the driving condition comprises a driving direction of the autonomous vehicle, whether the autonomous vehicle is in merging traffic, and whether the autonomous vehicle is approaching a road intersection;
   obtaining information of a data bandwidth requirement of the autonomous vehicle;
   adaptively adjusting an amount of output data from at least one sensor of the plurality of sensors by modifying, according to the determined driving condition and the information of the data bandwidth requirement, a first configuration parameter of the at least one sensor, wherein the first configuration parameter includes an aperture of the at least one sensor and wherein the at least one sensor faces a direction that is different from the driving direction and has a field of view of the merging traffic or the road intersection;
   enabling consistent data capturing and processing of the output data by adjusting, simultaneously with modifying the first configuration parameter and according to the determined driving condition, a second configuration parameter for processing the output data;
   processing the output data according to the adjusted second configuration parameter; and
   controlling the steering system, and/or the brake system of the autonomous vehicle to perform a subsequent operation based on the processed output data.

2. The control system of claim 1, wherein the global information comprises a global coordinate of the autonomous vehicle.

3. The control system of claim 1, wherein the processor is configured to derive the perceived environment further based on one or more high-definition maps.

4. The control system of claim 1, wherein the at least one sensor includes the at least one camera, and wherein the first configuration parameter further includes a resolution or a frame rate of the at least one camera.

5. The control system of claim 1, further comprising:
   a plurality of sensor mounts each of which corresponds to at least one of the plurality of sensors, wherein the processor is further configured to adjust the plurality of sensor mounts to adjust a position or an angle of each of the plurality of sensors.

6. The control system of claim 5, wherein each of the plurality of sensor mounts includes a motor to allow motorized movement of the at least one of the plurality of sensors.

7. The control system of claim 5, wherein the processor is configured to control each of the plurality of sensor mounts independently.

8. The control system of claim 1, wherein the data bandwidth requirement comprises at least one of a data processing bandwidth requirement or a data transfer bandwidth requirement.

9. A method for controlling an autonomous vehicle, comprising:
monitoring a surrounding of the autonomous vehicle by collecting data about the surrounding of the autonomous vehicle using a plurality of sensors equipped on the autonomous vehicle and facing different directions as current sensor data, the collected data including global information of where the autonomous vehicle is positioned;
deriving, at least in part using the current sensor data, an environment perceived by the autonomous vehicle in which the autonomous vehicle is positioned based on localizing the global information;
determining a driving condition of the autonomous vehicle based on the perceived environment and past sensor data that has been captured by at least one camera or at least one light detection and ranging (LIDAR) sensor of the plurality of sensors during a certain time interval prior to a moment at which the driving condition is determined, wherein the driving condition comprises a driving direction of the autonomous vehicle, whether the autonomous vehicle is in merging traffic, and whether the autonomous vehicle is approaching a road intersection;
obtaining information of a data bandwidth requirement of the autonomous vehicle;
adaptively adjusting an amount of output data from at least one sensor of the plurality of sensors by modifying, according to the determined driving condition and the information of the data bandwidth requirement, a first configuration parameter of the at least one sensor, wherein modifying the first configuration parameter comprises modifying an aperture of the at least one sensor and wherein the at least one sensor faces a direction that is different from the driving direction and has a field of view of the merging traffic or the road intersection;
enabling consistent data capturing and processing of the output data by adjusting, simultaneously with modifying the first configuration parameter and according to the determined driving condition, a second configuration parameter for processing the output data;
processing the output data according to the adjusted second configuration parameter; and
autonomously controlling a steering system, and/or a brake system of the autonomous vehicle to perform a subsequent operation based on the processed output data.

10. The method of claim 9, wherein localizing the global information comprises converting a global coordinate of the autonomous vehicle into a local coordinate based on one or more stored high-definition maps.

11. The method of claim 9, wherein deriving the perceived environment comprises constructing a three-dimensional representation of an external environment.

12. The method of claim 9, wherein determining the driving condition further comprises determining whether the autonomous vehicle is positioned at a junction.

13. The method of claim 9, wherein determining the driving condition further comprises determining whether the autonomous vehicle is driving uphill or downhill.

14. The method of claim 13, wherein the at least one sensor includes the at least one camera, and wherein modifying the first configuration parameter further comprises modifying a resolution, a frame rate, or a white balance setting of the at least one camera.

15. The method of claim 9, further comprising:
adjusting a position or an angle of each of the plurality of sensors via a plurality of sensor mounts.

16. An autonomous vehicle, comprising:
a steering system;
a brake system;
a monitoring system that comprises a plurality of sensors to monitor a surrounding of the autonomous vehicle by collecting data; and
a control system that includes a processor configured to control the steering system, and/or the brake system based on the monitoring by performing, by the processor, operations including:
receiving the collected data from the plurality of sensors equipped on the autonomous vehicle and facing different directions as current sensor data, the collected data comprising global information of where the autonomous vehicle is positioned;
deriving, at least in part using the current sensor data, an environment perceived by the autonomous vehicle based on localizing the global information;
determining a driving condition of the autonomous vehicle based on the perceived environment and past sensor data that has been captured by at least one camera or at least one light detection and ranging (LIDAR) sensor of the plurality of sensors during a certain time interval prior to a moment at which the driving condition is determined, wherein the driving condition comprises a driving direction of the autonomous vehicle, whether the autonomous vehicle is in merging traffic, and whether the autonomous vehicle is approaching a road intersection;
obtaining information of a data bandwidth requirement of the autonomous vehicle;
adaptively adjusting an amount of output data from at least one sensor of the plurality of sensors by modifying, according to the determined driving condition and the information of the data bandwidth requirement, a first configuration parameter of the at least one sensor, wherein the first configuration parameter comprises an aperture of the at least one sensor and wherein the at least one sensor faces a direction that is different from the driving direction and has a field of view of the merging traffic or the road intersection;
enabling consistent data capturing and processing of the output data by adjusting, simultaneously with modifying the first configuration parameter and according to the determined driving condition, a second configuration parameter for processing the output data;
processing the output data according to the adjusted second configuration parameter; and
controlling the steering system, and/or the brake system of the autonomous vehicle to perform a subsequent operation based on the processed output data.

17. The autonomous vehicle of claim 16, wherein the at least one sensor includes the at least one camera, and wherein the first configuration parameter further comprises a resolution or a frame rate of the at least one camera.

18. The autonomous vehicle of claim 16, wherein the data bandwidth requirement comprises at least one of a data processing bandwidth requirement or a data transfer bandwidth requirement.

* * * * *